April 20, 1965

D. R. TANGUY  3,179,879
WELL LOGGING APPARATUS WITH MEANS FOR MODIFYING ONE SIGNAL
COMPONENT BY A SECOND SIGNAL COMPONENT WHEN A
PREDETERMINED CONDITION OCCURS

Filed May 16, 1960 2 Sheets-Sheet 2

Denis R. Tanguy
INVENTOR.

BY Richard E. Bee
ATTORNEY

# United States Patent Office 3,179,879
Patented Apr. 20, 1965

3,179,879
WELL LOGGING APPARATUS WITH MEANS FOR MODIFYING ONE SIGNAL COMPONENT BY A SECOND SIGNAL COMPONENT WHEN A PREDETERMINED CONDITION OCCURS
Denis R. Tanguy, Houston, Tex., assignor to Schlumberger Well Surveying Corporation, Houston, Tex., a corporation of Texas
Filed May 16, 1960, Ser. No. 29,461
14 Claims. (Cl. 324—6)

This invention relates to electrical apparatus for investigating subsurface earth formations traversed by a borehole and, particularly, to such apparatus of the induction logging type wherein a coil system is utilized to investigate the electrical resistance characteristics of such subsurface formations.

In copending application Serial No. 7,315, filed February 8, 1960, in the name of James H. Moran, there is described an improved borehole induction logging system wherein means are provided for increasing the accuracy of the output signal obtained under severe borehole conditions where the occurrence of electrical skin effect phenomena in the formation material has a significant effect on such output signal. While the induction logging apparatus described in this copending application will provide generally satisfactory results, considerable care must be exercised in both the construction and operation of the apparatus so as to minimize the possibility of undesired drifts and changes in the operating characteristics of the apparatus under a wide variety of borehole conditions. It would be desirable, therefore, to further improve this type of apparatus so as to provide a high degree of operating stability with a minimum of special effort or attention.

It is an object of the invention, therefore, to provide new and improved borehole induction logging apparatus for measuring the electrical properties of subsurface earth formations penetrated by a borehole.

It is another object of the invention to provide new and improved induction logging apparatus which provides electrical skin effect compensation together with improved operating stability under a wide variety of borehole conditions.

It is a further object of the invention to provide new and improved induction logging apparatus which automatically provides both skin effect compensation and compensation for undesired signal components resulting from changes in the apparatus characteristics with temperature, pressure, and the like.

In accordance with the invention, induction logging apparatus for investigating earth formations traversed by a borehole comprises a coil system adapted for movement through the borehole and means for energizing the coil system with alternating current to develop a signal which is dependent on the electrical characteristics of the adjacent formation material. The apparatus also includes first phase sensitive circuit means responsive to the coil system signal for developing a signal representative of the magnitude of a given phase component thereof. The apparatus further includes second phase sensitive circuit means responsive to the coil system signal for developing a signal representative of the magnitude of a quadrature phase component thereof. The apparatus adiditionally includes means responsive to the quadrature-phase magnitude signal for minimizing the quadrature phase component whenever the given-phase magnitude signal is within a predetermined range of values. The apparatus also includes means for modifying the given-phase magnitude signal as a function of the quadrature-phase magnitude signal whenever the given- phase signal falls outside of the predetermined range of values. The apparatus further includes means for providing indications of the modified and unmodified given-phase magnitude signals.

For a better understanding of the present invention, together with other and further objects thereof, reference is had to the following description taken in connection with the accompanying drawings, the scope of the invention being pointed out in the appended claims.

Referring to the drawings.

Figure 1:
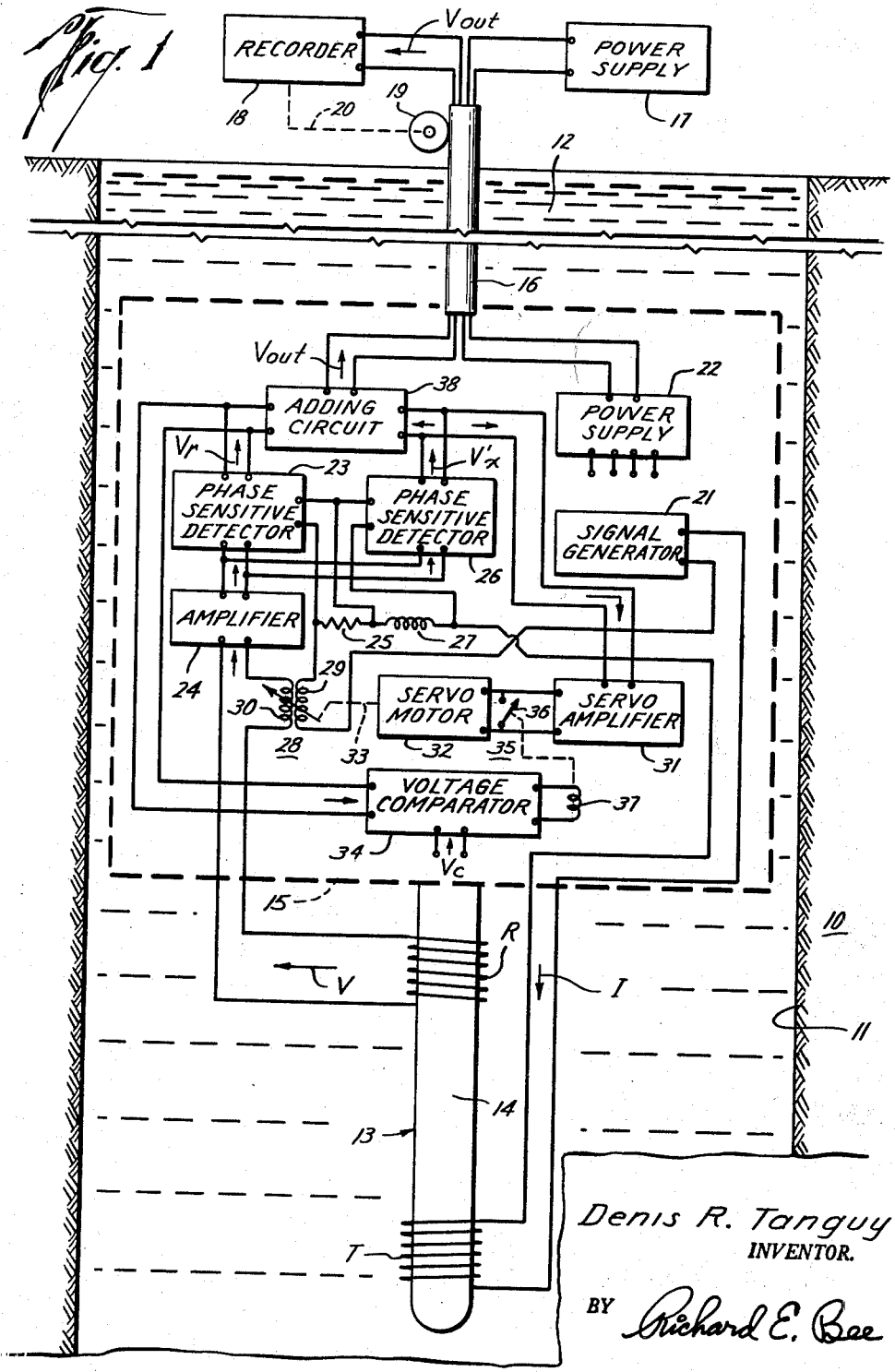
FIG. 1 illustrates in a schematic manner a representative embodiment of induction logging apparatus constructed in accordance with the present invention.

Referring to FIG. 1 of the drawings, there is shown a representative embodiment of induction logging apparatus constructed in accordance with the present invention for investigating earth formations 10 traversed by a borehole 11. The borehole 11 is usually filled with a conductive drilling liquid or drilling mud 12. The downhole portion of the induction logging apparatus includes a coil system 13 adapted for movement through the borehole 11. This coil system 13 includes at least one transmitter coil T and at least one receiver coil R. Each of these coils comprises a number of turns of conductive wire which is wound around an elongated, non-magnetic, non-conductive support member 14. For sake of simplicity, only a single transmitter coil and a single receiver coil are shown. It is to be understood, however, that a more complex form of coil system having a plurality of transmitter coils or a plurality of receiver coils or a plurality of both may be utilized in place of the two coil system of the present embodiment.

The upper end of the support member 14 is secured to fluid-tight instrument housing 15. This instrument housing 15 contains the various electrical circuits for energizing the coil system 13 and for developing the desired output signal.

The entire downhole portion of the apparatus including the coil system 13 and the instrument housing 15 is suspended from the surface of the earth by way of an armored multiconductor cable 16. Thus, by means of a suitable drum and winch mechanism (not shown), the length of cable 16 which is suspended in the borehole 11 may be either increased or decreased to provide the desired movement of the downhole apparatus through the borehole 11.

The portion of the induction logging apparatus located at the surface of the earth includes a power supply 17 for supplying the necessary electrical power required to operate the downhole electrical circuit. Also located at the surface of the earth is a recorder 18 for recording the resultant output signal developed by the downhole apparatus. Recorder 18 is of the recording galvanometer type wherein a beam of light is deflected by a galvanometer across a photographic film material to provide a permanent record of the downhole output signals. In order that this record or log may be plotted in terms of borehole depth, the photographic film is caused to move at right angles to the direction of the light beam deflection as the downhole apparatus moves through the borehole 11. This movement of the photographic film is synchronized with the movement of the downhole apparatus by means of a measuring wheel 19 and a suitable mechanical linkage indicated schematically by dashline 20.

Considering now the electrical circuits contained within the downhole instrument housing 15, such circuits include means for energizing the coil system 13 with alternating current to develop a signal which is dependent on the electrical characteristics of the adjacent formation material. This energizing means is represented by a signal generator 21 which is connected to the transmitter coil T. This signal generator 21 is constructed to provide an alternating output current of constant amplitude and having a frequency of, for example, 20 kilocycles per second.

Suitable operating power for the signal generator 21, as well as the other downhole electrical circuits, is provided by a downhole power supply 22. This downhole power supply 22 is connected to the surface power supply 17 by way of a pair of the insulated conductors contained within the cable 16. For sake of simplicity, the various interconnections between the downhole power supply 22 and the other downhole electrical circuits has been omitted.

The downhole electrical circuits of the present embodiment further include first phase sensitive circuits means responsive to the coil system signal for developing a signal representative of the magnitude of a given phase component thereof. This circuit means is represented by a phase sensitive detector 23 which is coupled to the receiver coil R by way of an alternating-current signal amplifier 24. Also supplied to this phase sensitive detector 23 is a phase reference signal which is developed across a resistor 25 which is connected in series in the energizing current path for the transmitter coil T. This phase reference signal bears an in-phase relationship with respect to the phase of the transmitter coil energizing current I. Under the control of this phase reference signal, the phase sensitive detector 23 serves to detect the phase component of the receiver coil signal which is in phase with the transmitter coil energizing current I. There is thus produced at the output of phase sensitive detector 23 a unidirectional or direct-current type of output signal having a magnitude which is proportional to the magnitude of such in-phase component.

The downhole electrical circuits of the present embodiment also include second phase sensitive circuit means responsive to the coil system signal for developing a signal representative of the magnitude of a quadrature phase component thereof. This second phase sensitive circuit means is represented by a second phase sensitive detector 26 which is also coupled to the receiver coil R by way of the amplifier 24. Also supplied to the phase sensitive detector 26 is a phase reference signal developed across an inductor 27 connected in series in the transmitter coil energizing current path. Under the control of this phase reference signal, the phase sensitive detector 26 serves to detect the quadrature phase component of the receiver coil signal, that is, the phase component which is 90° out of phase with respect to the transmitter coil energizing current I. There is thus produced at the output of phase sensitive detector 26 a unidirectional or direct-current type of signal having a magnitude which is proportional to the magnitude of the quadrature phase component of the receiver coil signal.

The downhole electrical circuits of the present embodiment further include means responsive to the quadrature-phase magnitude signal for minimizing the quadrature phase component whenever the given-phase or in-phase magnitude signal is within a predetermined range of values. This quadrature-phase minimizing means includes feedback circuit means having adjustable signal means for combining an opposite-polarity quadrature signal with the receiver coil signal for minimizing or balancing out the quadrature phase component. This adjustable signal means includes a variable transformer 28 having a primary winding 29 connected in series in the transmitter coil energizing current path and a secondary winding 30 connected in series with the receiver coil R. The primary winding 29 is connected with the appropriate polarity so that the quadrature phase component produced across the secondary winding 30 will be of opposite polarity to, that is, 180° out of phase with respect to the quadrature component normally induced in the receiver coil R by the direct flux linkage between the transmitter coil T and the receiver coil R.

This feedback circuit means also includes servo motor means for automatically adjusting the adjustable signal means represented by variable transformer 28 to maintain the desired balancing out or cancellation of the quadrature phase component. This servo motor means includes a servo amplifier 31 connected to the output of the phase sensitive detector 26 and a servo motor 32 connected to the output of servo amplifier 31. The output shaft of servo motor 32 is mechanically coupled to the variable transformer 28 as is indicated schematically by dashline 33.

The quadrature-phase minimizing means of the present embodiment also includes means for disabling the feedback circuit means whenever the in-phase magnitude signal is greater than a predetermined value. This disabling means includes signal comparator means, represented by a voltage comparator 34 which is coupled to the output of the phase sensitive detector 23 for producing a control signal whenever the in-phase magnitude signal is greater than a predetermined value established by a direct-current reference voltage $V_c$ of fixed magnitude. This reference voltage $V_c$ is obtained either from the downhole power supply 22 or by means of a suitable battery. This disabling means further includes switching means responsive to the control signal from voltage comparator 34 for disabling the feedback circuit means or, more particularly, the servo motor 32. In the present embodiment, this switching means is represented by a relay 35 having a switch element 36 connected across the input terminals of servo motor 32 and a relay coil 37 connected across the output terminals of voltage comparator 34.

The apparatus of the present embodiment further includes means for modifying the in-phase magnitude signal as a function of the quadrature-phase magnitude signal whenever the in-phase magnitude signal is greater than the predetermined value. This modifying means is represented by an adding circuit 38 having separate pairs of input terminals thereof coupled to different ones of the phase sensitive detectors 23 and 26. The output terminals of the adding circuit 38 are, in turn, coupled to recording means represented by the recording 18 at the surface of the earth for providing an indication of the resulting unidirectional signal appearing at the output of such adding circuit 38. This connection to the recorder 18 is made by way of a second pair of insulated conductors contained within the cable 16.

Considering now the operation of the FIG. 1 apparatus just described, as the downhole portion of the apparatus including the coil system 13 and the instrument housing 15 is moved through the borehole 11, signal generator 21 operates to energize the transmitter coil T with alternating current of constant amplitude and constant frequency. There is thus produced in the vicinity of the transmitter coil T an alternating electromagnetic flux field which links with the receiver coil R and which also penetrates into the adjacent earth formations. The portion of this flux field which penetrates into the adjacent formation material serves to induce therein a secondary current flow commonly referred to as "eddy current." As a result of this flux linkage and these secondary currents, there are induced in the receiver coil R various voltage components which combine to produce the net receiver coil voltage V. More particularly, the direct flux linkage between the transmitter coil T and the receiver coil R induces a relatively large quadrature phase voltage component in the receiver coil R. The secondary currents flowing in the adjacent formation material, on the other hand, produce both in-phase and quadrature-phase voltage components in the receiver coil R. If drilling mud 12 is present in the borehole 11 and if it is of a conductive nature, then any secondary currents flowing in such drilling mud will likewise produce both in-phase and quadrature-phase components. A detailed consideration of the effects of secondary currents in the drilling mud 12 is not essential to an understanding of the present invention and, accordingly, this component of the secondary current flow will not hereinafter be given any separate consideration.

The net voltage V induced in the receiver coil R is described mathematically by the expression:

$$V = V_r + jV_x \qquad (1)$$

$V_r$ denotes the net receiver coil voltage component which is in phase with the transmitter coil energizing current I. $V_x$ denotes the net receiver coil voltage component which bears a quadrature phase relationship with respect to the transmitter coil energizing current I. The in-phase voltage component $V_r$ is, in turn, described by the mathematical expression:

$$V_r = V_g - V_s \qquad (2)$$

$V_g$ denotes a linear or "geometrical factor" component of the in-phase voltage. For the case where the coil system is in an extended formation interval of uniform or homogeneous conductivity, $V_g$ is described by the expression:

$$V_g = k\sigma \qquad (3)$$

where "k" denotes a proportionality constant and "$\sigma$" denotes the conductivity of the formation material. The manner in which the linear in-phase component $V_g$ varies with formation conductivity is indicated graphically by the correspondingly designated curve of FIG. 2.

The $V_s$ in-phase component of Equation 2 denotes a nonlinear voltage component resulting from the occurrence of electrical skin effect phenomena in the adjacent formation material. For the case of homogeneous formation conditions, this skin effect component $V_s$ is described by the expression:

$$V_s \cong k'\sigma^{3/2} \qquad (4)$$

where $k'$ denotes a proportionality constant and $\sigma$ again denotes the formation conductivity. As seen from Equation 2, this skin effect component $V_s$ acts to reduce the in-phase signal $V_r$ in a nonlinear manner as the formation conductivity increases. Thus, the net in-phase voltage $V_r$ varies in the manner indicated by the correspondingly designated curve of FIG. 2. It is highly desirable to eliminate this nonlinear skin effect component from the net in-phase signal in order that such signal may vary in a linear manner with respect to the formation conductivity values.

Considering the quadrature-phase component $V_x$ of Equation 1, such component is described by the expression:

$$V_x = V_m + V_x' \qquad (5)$$

$V_m$ denotes the voltage component resulting from direct flux linkage between the transmitter coil T and the receiver coil R. This component is independent of and not affected by variations in the formation conductivity. Consequently, this component may be described by the expression:

$$V_m = K \qquad (6)$$

where K is a constant. The $V_x'$ component of Equation 5, on the other hand, denotes the quadrature-phase voltage component resulting from the flow of secondary current in the formation material. For the case of homogeneous formation conditions, this quadrature-phase component is described by the expression:

$$V_x' \cong k'\sigma^{3/2} \qquad (7)$$

where $k'$ is the same proportionality constant which appeared in Equation 4.

It is seen from a comparison of Equations 4 and 7 that:

$$|V_x'| \cong |V_s| \qquad (8)$$

This relationship of Equation 8 is a basic relationship which can be utilized to provide the desired skin effect compensation. It states that the magnitude of the quadrature-phase voltage component $V_x'$ resulting from secondary current flow in the formation material is approximately equal to the magnitude of the undesired skin effect component $V_s$ which exists in the in-phase signal $V_r$. The validity of Equation 8, as well as the other of the foregoing equations, is discussed in greater detail in the above-mentioned copending application Serial No. 7,315, of Moran. As further discussed in the copending application, the relationship of Equation 8 is equally valid for complex multicoil systems as well as the relatively simple two-coil system presently being considered. Also, this relationship remains valid for most non-homogeneous as well as homogeneous formation conditions.

The $V_m$ quadrature component resulting from the direct flux linkage between transmitter and receiver coils remains constant as the formation conductivity changes. Consequently, this $V_m$ component does not supply any useful information about the formation conductivity. This $V_m$ component is, however, a very important factor in the construction and operation of the system because it has a relatively large magnitude compared to the magnitude of the desired in-phase $V_r$ signal. This makes it exceedingly difficult to separate out the desired $V_r$ component without, at the same time, obtaining some residual $V_m$ component. To make matters even more difficult, this $V_m$ component is subject to various causes of drift and change as the borehole environment changes. For example, the changing borehole temperature tends to change somewhat the length and other dimensions of the coil system. This can produce substantial changes in the $V_m$ component. The most reliable solution to this problem is to provide means for automatically balancing out or cancelling this undesired $V_m$ quadrature component and for automatically keeping it balanced out as formation conditions change. This, however, is in conflict with the desired use of the $V_x'$ quadrature component to provide skin effect compensation. This is because both of these components are quadrature components.

In accordance with the present invention, means are provided whereby the benefits of both automatic cancellation of the $V_m$ component and skin effect compensation by means of the $V_x'$ components are obtained. Basically, this double advantage is obtained by providing automatic balancing or automatic cancellation of the undesired $V_m$ component whenever the formation conductivity is less than a predetermined value and by providing the desired skin effect compensation whenever the formation conductivity is greater than this same predetermined value. A typical figure for this predetermined conductivity value is 100 millimhos per meter. The exact value for any particular case will depend on the particular form of coil system being utilized and especially on its susceptibility to the presence of electrical skin effect phenomena in the formation material. The basic criteria is that the skin effect compensation should be applied at that point where no further increase in the skin effect error can be tolerated.

Assuming first that the effective or apparent formation conductivity seen by the coil system 13 is less than the predetermined value, then the net receiver coil voltage V is supplied by way of the amplifier 24 to the two phase sensitive detectors 23 and 26. The corresponding phase reference signals developed across resistor 25 and inductor 27 are such that the phase sensitive detector 23 develops a unidirectional output signal corresponding to the net in-phase signal $V_r$ while the phase sensitive detector 26 develops a unidirectional output signal corresponding to the magnitude of any quadrature phase component supplied to the input thereof. At the same time, a substantial opposite-polarity quadrature-phase signal is being combined with the receiver coil signal V by the transformer 28. This cancels a large part of the undesired $V_m$ quadrature component. Consequently, the unidirectional output signal from phase sensitive detector 26 represents only the residual or remaining quadrature phase component. This unidirectional signal from the detector 26 is then supplied by way of the servo amplifier 31 to the servo motor 32. Servo motor 32 acts to adjust the mutual inductance of the variable transformer 28 until the input signal to such servo motor 32 is reduced to a value of substantially zero. This occurs when the net quadrature component supplied to the phase sensitive detector 26 assumes a value of zero. There is thus provided by way of the servo amplifier 31 and servo motor 32 a degenerative feedback loop for minimizing or balancing out any quadrature phase components appearing in the receiver coil signal.

In order to obtain an output signal which is indicative of the formation conductivity, the output signals from each of phase sensitive detectors 23 and 26 are supplied to an adding circuit 38. Adding circuit 38 serves to add the two signals supplied thereto to develop a resultant output signal $V_{out}$. With the servo feedback loop operative, however, the quadrature-representative signal from phase sensitive detector 26 has a value of substantially zero. Consequently, the adding circuit output signal $V_{out}$ is:

$$V_{out} = V_r = (V_g - V_s) \qquad (9)$$

Figure 2:
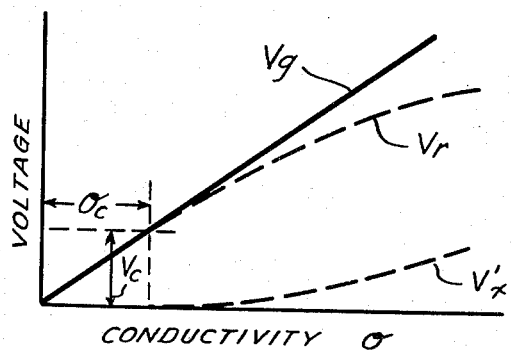
FIG. 2 is a graph used in explaining the operation of the FIG. 1 apparatus.

As seen from the graph of FIG. 2, where $\sigma_c$ denotes the predetermined conductivity value, the output signal $V_{out}$ is:

$$V_{out} \cong V_g \qquad (10)$$

In other words, when the formation conductivity is less than the predetermined $\sigma_c$ value, substantially no skin effect component is present in the in-phase $V_r$ signal. Consequently, such signal corresponds to the desired linear geometrical factor component $V_g$. This output signal $V_{out}$ is then supplied by way of the cable 16 to the recorder 18 located at the surface of the earth to provide the desired record of such resulting output signal value.

Assuming now that that the effective or apparent formation conductivity seen by the coil system 13 is greater than the predetermined $\sigma_c$ value, then the first thing that happens is that the servo feedback loop is disabled. This action is obtained by supplying the in-phase $V_r$ magnitude signal appearing at the output of phase sensitive detector 23 to the voltage comparator 34. Also supplied to the voltage comparator 34 is a fixed unidirectional reference voltage $V_c$. The value of this reference voltage is selected to correspond to the predetermined conductivity value $\sigma_o$, as indicated on FIG. 2. Whenever the $V_r$ voltage exceeds the reference voltage $V_c$, the voltage comparator 34 produces a control signal which is supplied to the relay coil 37 to cause the switch 36 to close. With the switch 36 closed, the input of the servo motor 32 is shorted out. This prevents any further driving voltage from reaching servo motor 32. In the absence of any driving voltage, the servo motor output shaft 33 remains in its previous position. Thus, the opposite-polarity quadrature-phase signal appearing across the secondary winding 30 of variable transformer 28 remains fixed at the value it had just before the switch 36 closed. Consequently, the undesired $V_m$ quadrature component resulting from direct flux linkage continues to be balanced out. However, because the servo loop is now disabled, any further changes in the net quadrature component will not be cancelled.

As seen from FIG. 2 as the formation conductivity increases, the quadrature component $V_x'$ will likewise increase. With the feedback loop disabled, this $V_x'$ quadrature component will now appear at the output of the phase sensitive detector 26. Consequently, the output signal $V_{out}$ developed by adding circuit 38 is now:

$$V_{out} = (V_r + V_x') = (V_g - V_s + V_x') \qquad (11)$$

As indicated by Equation 8, the skin effect component $V_s$ is approximately equal to the quadrature component $V_x'$ so that the net output signal is effectively:

$$V_{out} = V_g \qquad (12)$$

In other words, when the conductivity is greater than the predetermined $\sigma_o$ value, the adding circuit 38 serves to augment the magnitude of the in-phase magnitude signal $V_r$ by adding thereto the quadrature-phase magnitude signal $V_x'$. This compensates for the undesired skin effect non-linearity to provide a linear output signal corresponding to the linear $V_g$ signal. This result may also be seen from the graph of FIG. 2.

From the foregoing considerations of the two possible modes of operation of the present apparatus, it is seen that, as the downhole portion of the apparatus moves through the borehole, the apparatus automatically operates to provide any necessary readjustment of the balance required for cancelling the $V_m$ component whenever the coil system is passing through a formation interval having an apparent conductivity of less than the predetermined $\sigma_c$ value. In the usual situation, this readjustment of the balance condition will occur a goodly number of times during the course of the borehole survey. Consequently, there is no longer any great concern as to whether the original balance condition set at the surface of the earth is satisfactory for the entire period of the borehole survey. This is particularly important when it is noted that the borehole being surveyed may extend 15,000 to 20,000 feet into the earth and may require up to three hours or more to investigate the entire length thereof.

Over the intervening formation intervals where the apparent conductivity is greater than the predetermined $\sigma_c$ value, automatic readjustment of the quadrature balance is discontinued so that the desired skin effect compensation may be obtained. These formation intervals where the apparent conductivity is greater than the predetermined $\sigma_c$ value are the same intervals where the undesired skin effect error becomes significant.

Figure 3:
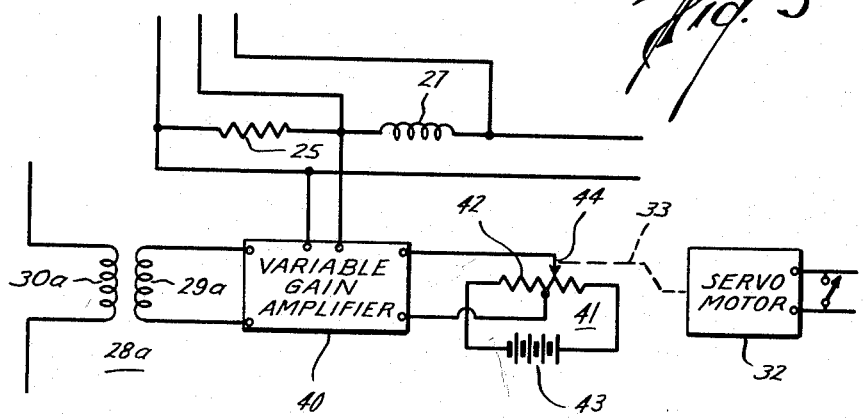
FIG. 3 illustrates a modified form of a portion of the FIG. 1 apparatus.

Referring now to FIG. 3 of the drawings, there is shown a modified form of construction for the adjustable signal means represented by the variable transformer 28 of FIG. 1. This modified form of adjustable signal means shown in FIG. 3 includes a variable gain amplifier 40, the output of which is connected to a non-variable transformer 28a which is substituted in place of the variable transformer 28 of FIG. 1. An alternating-current driving signal for the variable gain amplifier 40 is provided by coupling the input of the amplifier 40 to the resistor 25 located in the transmitter coil energizing current path. The alternating-current signal gain of the amplifier 40 is controlled by a potentiometer circuit 41 which includes a potentiometer 42 and a direct-current battery 43. An adjustable potentiometer arm 44 is mechanically coupled to the output shaft of the servo motor 32 as indicated by dash-line 33.

When the servo feedback loop is operative, servo motor 32 adjusts the direct-current bias applied to the variable gain amplifier 40 by the potentiometer network 41 so as to adjust the alternating-current gain of the amplifier 40 so that the opposite-polarity alternating-current signal appearing across the secondary winding 30a of the transformer 28a will be of the proper magnitude to cancel the undesired $V_m$ quadrature component. When the servo feedback loop is disabled, the servo motor 32 and, hence, the potentiometer arm 44 remain at their previous settings. This causes the opposite-polarity quadrature signal across the secondary winding 30a to remain at its previous value. There is thus provided the same type of operation as was provided for the FIG. 1 apparatus.

While there have been described what are at present considered to be preferred embodiments of this invention, it will be obvious to those skilled in the art that various changes and modifications may be made therein without departing from the invention and it is, therefore, intended to cover all such changes and modifications as fall within the true spirit and scope of the invention.

What is claimed is:

1. In induction logging apparatus for investigating earth formations traversed by a borehole, the combination comprising: a coil system adapted for movement through the borehole; means for energizing the coil system with alternating current to develop a signal which is dependent on the electrical characteristics of the adjacent formation material; first phase sensitive circuit means responsive to the magnitude of a first phase component of the coil system signal for developing a first output signal; second phase sensitive circuit means responsive to the magnitude of a second phase component of the coil system signal for developing a second output signal, this second phase component being in phase quadrature with the first phase component; means responsive to the second output signal for minimizing the second phase component whenever the first output signal is within a predetermined range of values; means for modifying the first output signal as a function of the second output signal whenever the first output signal falls outside of the predetermined range of values; and means for providing indications of the modified and unmodified first output signals.

2. In induction logging apparatus for investigating earth formations traversed by a borehole, the combination comprising: a coil system adapted for movement through the borehole; means for energizing the coil system with alternating current to develop a signal which is dependent on the electrical characteristics of the adjacent formation material; first phase sensitive circuit means responsive to the magnitude of a first phase component of the coil system signal for developing a first output signal; second phase sensitive circuit means responsive to the magnitude of a second phase component of the coil system signal for developing a second output signal, this second phase component being in phase quadrature with the first phase component; means responsive to the second output signal for minimizing the second phase component whenever the first output signal is less than a predetermined value; means for modifying the first output signal as a function of the second output signal whenever the first output signal is greater than the predetermined value; and means for providing an indication of the unmodified first output signal whenever such signal is less than the predetermined value and for providing an indication of the modified first signal whenever the unmodified first signal is greater than the predetermined value.

3. In induction logging apparatus for investigating earth formations traversed by a borehole, the combination comprising: a coil system adapted for movement through the borehole; means for energizing the coil system with alternating current to develop a signal which is dependent on the electrical characteristics of the adjacent formation material; first phase sensitive circuit means responsive to the magnitude of a first phase component of the coil system signal for developing a first output signal; second phase sensitive circuit means responsive to the magnitude of a second phase component of the coil system signal for developing a second output signal, this second phase component being in phase quadrature with the first phase component; means responsive to the second output signal for minimizing the second phase component whenever the first output signal is within a predetermined range of values; means for increasing the magnitude of the first output signal as a function of the magnitude of the second output signal whenever the first signal falls outside of the predetermined range of values; and means for providing an indication of the resulting first output signal.

4. In induction logging apparatus for investigating earth formations traversed by a borehole, the combination comprising: a coil system adapted for movement through the borehole; means for energizing the coil system with alternating current to develop a signal which is dependent on the electrical characteristics of the adjacent formation material; first phase sensitive circuit means responsive to the magnitude of a first phase component of the coil system signal for developing a first output signal; second phase sensitive circuit means responsive to the magnitude of a second phase component of the coil system signal for developing a second output signal, this second phase component being in phase quadrature with the first phase component; means responsive to the second output signal for minimizing the second phase component whenever the first output signal is within a predetermined range of values; means for augmenting the magnitude of the first output signal by adding thereto the second output signal whenever the first signal falls outside of the predetermined range of values; and means for providing an indication of the resulting first output signal.

5. In induction logging apparatus for investigating earth formation traversed by a borehole, the combination comprising: a coil system adapted for movement through the borehole; means for energizing the coil system with alternating current to develop a signal which is dependent on the electrical characteristics of the adjacent formation material; first phase sensitive circuit means responsive to the magnitude of a first phase component of the coil system signal for developing a first output signal; second phase sensitive circuit means responsive to the magnitude of a second phase component of the coil system signal for developing a second output signal, this second phase component being in phase quadrature with the first phase component; means responsive to the second output signal for cancelling the second phase component whenever the first output signal is within a predetermined range of values; means for limiting the second phase cancellation so that any change occurring in the second phase component whenever the first output signal falls outside of the predetermined range of values is not cancelled; means for modifying the first output signal as a function of any change in the second output signal whenever the first signal falls outside of the predetermined range of values; and means for providing indications of the modified and unmodified first output signals over their respective ranges of values.

6. In induction logging apparatus for investigating earth formations traversed by a borehole, the combination comprising: a coil system adapted for movement through the borehole; means for energizing the coil system with alternating current to develop an alternating-current signal which is dependent on the electrical characteristics of the adjacent formation material; first phase sensitive circuit means responsive to the magnitude of a first phase component of the coil system signal for developing a first unidirectional signal; second phase sensitive circuit means responsive to the magnitude of a second phase component of the coil system signal for developing a second unidirectional signal, this second phase component being in phase quadrature with the first phase component; means responsive to the second unidirectional signal for minimizing the second phase component whenever the first unidirectional signal is within a predetermined range of values; means for modifying the first unidirectional signal as a function of the second unidirectional signal whenever the first signal falls outside of the predetermined range of values; and means for providing indications of the modified and unmodified first unidirectional signals.

7. In induction logging apparatus for investigating earth formations traversed by a borehole, the combination comprising: a coil system adapted for movement through the borehole and including at least one transmitter coil and at least one receiver coil; means for energizing the transmitter coil with alternating current to induce in the receiver coil a signal which is dependent on the electrical characteristics of the adjacent formation material; a first phase sensitive detector responsive to the magnitude of a first phase component of the receiver coil signal for developing a first output signal; a second phase sensitive detector responsive to the magnitude of a second phase component of the receiver coil signal for developing a second output signal, this second phase component being in phase quadrature with the first phase component; feedback circuit means responsive to the second output signal for minimizing the second phase component; means for disabling the feedback circuit means whenever the first output signal is greater than a predetermined value; means for modifying the first output signal as a function of the second output signal whenever the first signal is greater than the predetermined value; and means for providing an indication of the resulting first output signal.

8. In induction logging apparatus for investigating earth formations traversed by a borehole, the combination comprising: a coil system adapted for movement through the borehole and including at least one transmitter coil and at least one receiver coil; means for energizing the transmitter coil with alternating current to induce in the receiver coil an alternating-current signal which is dependent on the electrical characteristics of the adjacent formation material; a first phase sensitive detector responsive to the magnitude of a first phase component of the receiver coil signal for developing a first unidirectional signal; a second phase sensitive detector responsive to the magnitude of a second phase component of the receiver coil signal for developing a second unidirectional signal, this second phase component being in phase quadrature with the first phase component; feedback circuit means responsive to the second unidirectional signal for minimizing the second phase component; means for disabling the feedback circuit means whenever the first unidirectional signal is greater than a predetermined value; means for modifying the first unidirectional signal as a function of the second unidirectional signal whenever the first signal is greater than the predetermined value; and means for providing an indication of the resulting first unidirectional signal.

9. In induction logging apparatus for investigating earth formations traversed by a borehole, the combination comprising: a coil system adapted for movement through the borehole and including at least one transmitter coil and at least one receiver coil; means for energizing the transmitter coil with alternating current to induce in the receiver coil a signal which is dependent on the electrical characteristics of the adjacent formation material; a first phase sensitive detector responsive to the receiver coil signal for developing a signal representative of the magnitude of the phase component thereof which is in phase with the transmitter coil energizing current; a second phase sensitive detector responsive to the receiver coil signal for developing a signal representative of the magnitude of the phase component thereof which is in phase quadrature with the transmitter coil energizing current; feedback circuit means responsive to the quadrature-phase magnitude signal for minimizing the quadrature phase component; means for disabling the feedback circuit means whenever the in-phase magnitude signal is greater than a predetermined value; means for modifying the in-phase magnitude signal as a function of the quadrature-phase magnitude signal whenever the in-phase signal is greater than the predetermined value; and means for providing an indication of the resulting in-phase magnitude signal.

10. In induction logging apparatus for investigating earth formations traversed by a borehole, the combination comprising: a coil system adapted for movement through the borehole and including at least one transmitter coil and at least one receiver coil; means for energizing the transmitter coil with alternating current to induce in the receiver coil a signal which is dependent on the electrical characteristics of the adjacent formation material; a first phase sensitive detector responsive to the magnitude of a first phase component of the receiver coil signal for developing a first output signal; a second phase sensitive detector responsive to the magnitude of a second phase component of the receiver coil signal for developing a second output signal, this second phase component being in phase quadrature with the first phase component; adjustable signal means for combining an opposite-polarity signal of the second phase with the receiver coil signal; servo motor means responsive to the second output signal for adjusting the adjustable signal means to minimize the second phase component; means for disabling the servo motor means whenever the first output signal is greater than a predetermined value; means for modifying the first output signal as a function of the second output signal whenever the first signal is greater than the predetermined value; and means for providing an indication of the resulting first output signal.

11. In induction logging apparatus for investigating earth formations traversed by a borehole, the combination comprising: a coil system adapted for movement through the borehole and including at least one transmitter coil and at least one receiver coil; means for energizing the transmitter coil with alternating current to induce in the receiver coil a signal which is dependent on the electrical characteristics of the adjacent formation material; a first phase sensitive detector responsive to the magnitude of a first phase component of the receiver coil signal for developing a first output signal; a second phase sensitive detector responsive to the magnitude of a second phase component of the receiver coil signal for developing a second output signal, this second phase component being in phase quadrature with the first phase component; variable gain amplifier means having its output coupled to the receiver coil; means for energizing the input of the variable gain amplifier means with alternating current for producing at the amplifier output an opposite-polarity signal of the second phase which combines with the receiver coil signal; servo motor means responsive to the second output signal for varying the gain of the amplifier means to minimize the second phase component; means for disabling the servo motor means whenever the first output signal is greater than a predetermined value; means for modifying the first output signal as a function of the second output signal whenever the first signal is greater than the predetermined value; and means for providing an indication of the resulting first output signal.

12. In induction logging apparatus for investigating earth formations traversed by a borehole, the combination comprising: a coil system adapted for movement through the borehole and including at least one transmitter coil and at least one receiver coil; means for energizing the transmitter coil with alternating current to induce in the receiver coil a signal which is dependent on the electrical characteristics of the adjacent formation material; a first phase sensitive detector responsive to the magnitude of a first phase component of the receiver coil signal for developing a first output signal; a second phase sensitive detector responsive to the magnitude of a second phase component of the receiver coil signal for developing a second output signal, this second phase component being in phase quadrature with the first phase component; feedback circuit means responsive to the second output signal for minimizing the second phase component; signal comparator means responsive to the first output signal for producing a control signal whenever the first output signal is greater than a predetermined value; switching means responsive to the comparator control signal for disabling the feedback circuit means; means for modifying the first output signal as a function of the second output signal whenever the first signal is greater than the predetermined value; and means for providing an indication of the resulting first output signal.

13. In induction logging apparatus for investigating earth formations traversed by a borehole, the combination comprising: a coil system adapted for movement through the borehole and including at least one transmitter coil and at least one receiver coil; means for energizing the transmitter coil with alternating current to induce in the receiver coil a signal which is dependent on the electrical characteristics of the adjacent formation material; a first phase sensitive detector responsive to the magnitude of a first phase component of the receiver coil signal for developing a first output signal; a second phase sensitive detector responsive to the magnitude of a second phase component of the receiver coil signal for developing a second output signal, this second phase component being in phase quadrature with the first phase component; feedback circuit means responsive to the second output signal for minimizing the second phase component; means for disabling the feedback circuit means whenever the first output signal is greater than a predetermined value; adding circuit means for augmenting the magnitude of the first output signal by adding thereto the second output signal whenever the first signal is greater than the predetermined value; and means for providing an indication of the resulting signal at the output of the adding circuit means.

14. In induction logging apparatus for investigating earth formations traversed by a borehole, the combination comprising: a coil system adapted for movement through the borehole and including at least one transmitter coil and at least one receiver coil; means for energizing the transmitter coil with alternating current to induce in the receiver coil an alternating-current signal which is dependent on the electrical characteristics of the adjacent formation material; a first phase sensitive detector responsive to the receiver coil signal for developing a unidirectional signal representative of the magnitude of the phase component thereof which is in phase with the transmitter coil energizing current; a second phase sensitive detector responsive to the receiver coil signal for developing a unidirectional signal representative of the magnitude of the phase component thereof which is in phase quadrature with the transmitter coil energizing current; adjustable signal means for combining an opposite-polarity quadrature-phase alternating-current signal with the receiver coil signal; servo motor means responsive to the quadrature-phase unidirectional signal for adjusting the adjustable signal means to minimize the quadrature phase component; signal comparator means responsive to the in-phase unidirectional signal for producing a control signal whenever the in-phase unidirectional signal is greater than a predetermined value; switching means responsive to the comparator control signal for disabling the servo motor means; adding circuit means for augmenting the magnitude of the in-phase unidirectional signal by adding thereto the quadrature-phase unidirectional signal whenever the in-phase signal is greater than the predetermined value; and recording means coupled to the output of the adding circuit means for providing an indication of the resulting in-phase unidirectional signal.

References Cited by the Examiner
UNITED STATES PATENTS

| | | | |
|---|---|---|---|
| 2,788,483 | 4/57 | Doll | 324—6 |
| 2,929,984 | 3/60 | Puranen et al. | 324—6 |
| 3,112,443 | 11/63 | Buckner | 324—6 |

FOREIGN PATENTS 210,928  10/57  Australia.

WALTER L. CARLSON, *Primary Examiner.*

FREDERICK M. STRADER, SAMUEL BERNSTEIN,
*Examiners.*